Nov. 28, 1961  D. P. TORRE  3,010,228
MAGNETIC TEACHING PANEL
Filed July 1, 1959
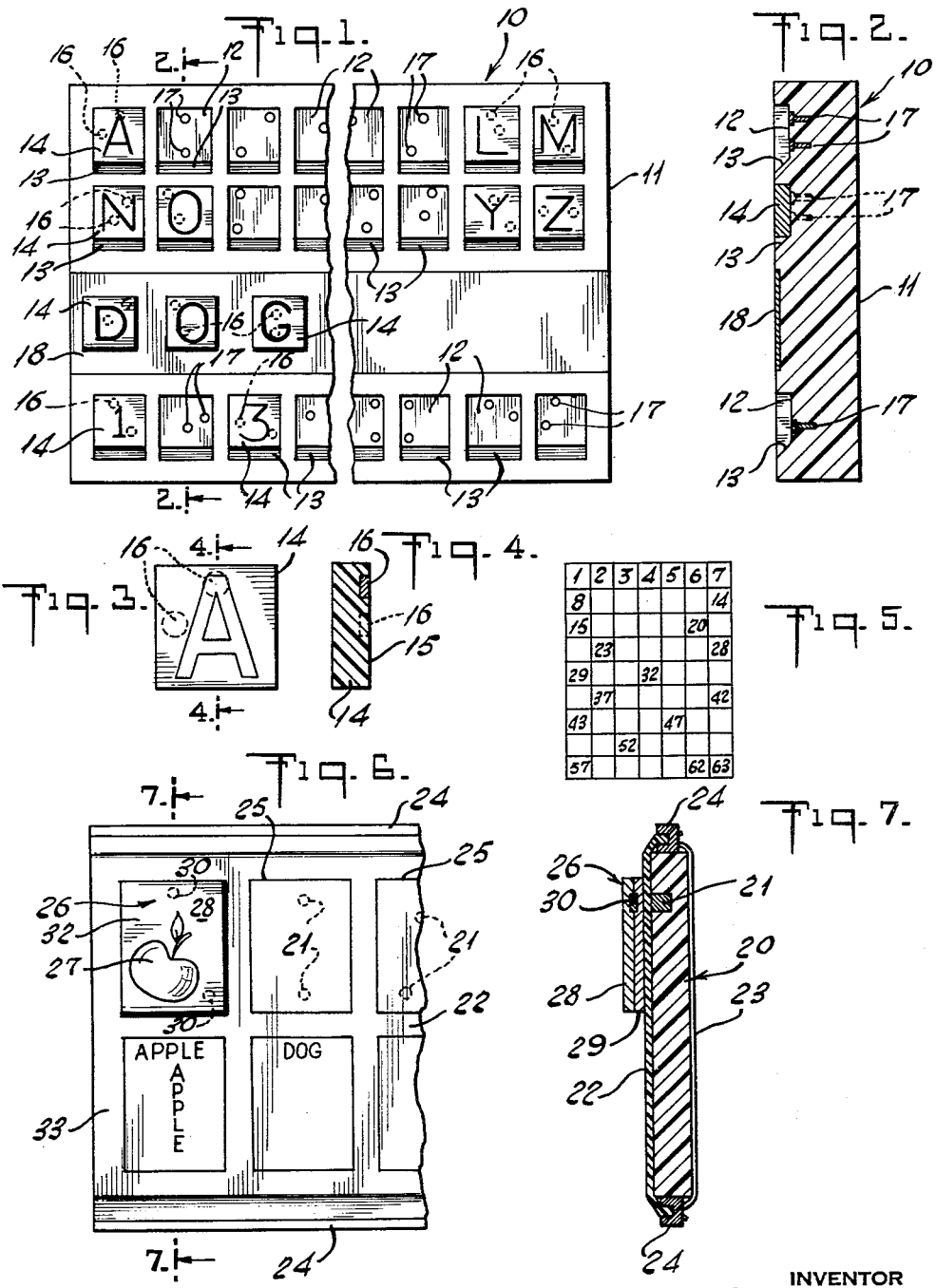
INVENTOR
DOUGLAS P. TORRE
BY
Burgess, Ryan & Hicks
ATTORNEYS

United States Patent Office 3,010,228
Patented Nov. 28, 1961

3,010,228
MAGNETIC TEACHING PANEL
Douglas P. Torre, 147 E. 50th St., New York 22, N.Y.
Filed July 1, 1959, Ser. No. 824,258
3 Claims. (Cl. 35—73)

This invention relates to a method and device for teaching the proper sequence of symbols in a set of symbols, such as the order of letters in the alphabet, and for teaching the relation between symbols in two different sets of symbols, as between pictures of objects and their written names. More particularly this invention relates to a panel provided with removable tiles bearing the symbols to be learned and having fastening means adapted to hold each tile only in a tile position corresponding to the relationship or sequence under study.

An object of the invention is the provision of a device by which a student may teach himself the order of symbols in a sequence with little or no aid from a teacher.

A further object is the provision of a method by which a student may place symbols in different positions in a sequence at random until the correct position in the sequence is reached, at which point a device will indicate the correctness of the placement and thereby reinforce the learning of the correct position by the student.

It is often necessary for people to memorize the proper sequence of symbols in a set of symbols. Examples are the sequence of letters in the alphabet, of numbers from one to ten, or the position of the chemical elements in the periodic table. In addition it is often necessary to memorize the relation between the individual symbols of one set of symbols and the individual symbols of another set, as for example the relation between printed nouns and pictures of the objects they stand for, or between words in one language and words in another. Learning is aided if the student can match the symbol with a position in the sequence or with another symbol and immediately find out if the matching is correct. Correct choices are thus reinforced and committed to memory, while mistakes are exposed before they become fixed in the mind. Since many sequences, such as letters in the alphabet, are taught to young children, teaching devices should be simple, interesting and pleasant to operate, and usable by the illiterate with little supervision. If they are adaptable for use in games the attention and interest of the child are easier to obtain.

The novel features of the invention will be understood from the following description, in which FIG. 1 is a partial front view of a panel employed in the first embodiment of the invention;

FIG. 2 is a cross-sectional side view of the panel of FIG. 1 sectioned on plane 2—2 of FIG. 1;

FIG. 3 is a front view of a tile;

FIG. 4 is a cross-sectional side view of the tile of FIG. 3 sectioned on plane 4—4 of FIG. 3;

FIG. 5 is a grid used in positioning magnets in a tile;

FIG. 6 is a partial front view of a panel employed in a second embodiment of the invention; and FIG. 7 is a cross-sectional side view of the panel of FIG. 6 sectioned on plane 7—7 of FIG. 6.

As seen in FIGS. 1 and 2, a panel 10 is comprised of a backing 11, which may be of wood, plastic or other suitable material. In the embodiment illustrated rectangular tile positions 12 are sunk into the backing. The bottom surface 13 of the tile positions slopes downwardly. Tiles 14 fit loosely into the tile positions. The slope of bottom surface 13 prevents the tiles from finding supoprt from the bottom surface. Each tile as illustrated in FIGS. 1, 2 and 3 has hidden in its rear surface 15 at least one small permanent magnet 16, which may be of the well-known alnico or any other suitable type. As shown in FIG. 3 two such magnets may be used. Iron nails or screws 17 are driven into the rear surface of the tile positions. Each tile has a matching tile position in which the magnets in the tile overlie the iron nails. When the tile is placed in its matching tile position the attraction between the magnets and the nails holds the tile in place. The placement of the nails and magnets in the panels and tiles is its own matching tile position. This placement may be accomplished by making a grid such as that shown in FIG. 5 on a piece of paper having the same width and length as the tile 14. The grid is divided into numbered rectangles. Where each tile 14 is to have two hidden magnets and there are to be 26 tiles, at least 52 rectangles should be present; FIG. 5 shows 63. For each tile two numbers are chosen from those between 1 and 63. The paper is superimposed on a tile and the position of the squares bearing the chosen numbers is marked on the tile. The paper is then superimposed on the tile position 12 selected for that tile and the position of the same squares marked on the tile position. The magnets are located on the tile in the marked positions and the nails on the tile position in similar fashion. Different numbers are chosen for each tile.

Each tile bears a symbol; the letters of the alphabet and numerals are shown in FIG. 1. Children may learn the sequence of letters by trial and error, fitting each tile into tile positions at random until it sticks to the panel. After doing this a number of times, they will learn to place the tiles acording to the alphabetical sequence, perceiving that the alphabet begins with "A," ends with "Z," and that "O" follows "N," etc.

A steel sheet 18 is shown attached to the front of the panel; words may be spelled out on it using the lettered tiles.

It will be understood that in FIGS. 1 and 2 the iron nails might be driven into the tiles and the magnets placed in the panel. It will also be understood that magnets might be used in both the tiles and the panel. In the latter construction the magnets may be so oriented that when a tile is placed in the wrong tile position like ends of two magnets abut, and the tile is actively repelled from the tile position.

Furthermore, the tile positions 12, which are recesses sunk into the front of the panel as shown in FIG. 1, may consist simply of rectangles, or other shapes congruent with the shape of the tiles, printed on the panel surface. In this case the tiles are accurately fitted to the rectangles in finding the correct tile position. The tiles, which are rectangular as shown, may have other shapes.

FIGURES 6 and 7, show a modified construction. Magnets 21 are shown embedded in panel 20, a thin sheet 22, which may be of flexible plastic, is stretched across the face of panel 20 by elastic band 23 connected to edge strips 24 on the sheet. As shown, the bottom half of sheet 22 is printed with a set of words such as "apple" and "dog." Above each word is a printed rectangle 25. Each card 26, of which one is shown, has the same dimensions as the rectangles and has a picture 27 on its face corresponding to one of the words printed on the sheet. Tile 26 is comprised of two glued layers 28 and 29, which may be of stiff cardboard. Between the layers is sandwiched a small disk 30 of iron or other magnetic material. The positions of the magnets and disks may be varied as described in connection with FIG. 1 so that each tile is magnetically attracted to only one tile position. While tiles may be adhered to other magnets, they will be found to line up with the printed rectangles 25 in only one position.

With this design a large number of sheets 22 may be printed with corresponding tiles 26, and used with only one panel 20 and set of magnets 21. If desired the background 32 of the tiles and the background 33 of the matching sheet may be similarly colored to aid the students in keeping the tiles and sheets together. It will be understood that as in the first embodiment, the magnets be attached to the tiles and iron nails used in the panel, or magnets may be used in both places.

If the student is to learn the sequence or relation between words which is being taught, he should not be able to fit the tiles into the tile positions by examining the fastening means. If he is able to see both the magnets and nails, he may match these instead of matching the symbols. This may be avoided by painting over the magnets and/or the nails in the construction of FIGS. 1 and 2. In FIGS. 6 and 7 the sheet 22 hides the magnet positions, but they may be painted over as well, if desired.

The therm "magnetic means" as used herein will be understood to include both permanent magnets and unmagnetized magnetic materials such as soft iron.

While preferred methods of carrying out the present invention have been described and illustrated herein, it will be understood that various modifications and changes may be made therein without departing from the scope of the invention as defined by the following claims.

What is claimed is:

1. A panel, tile positions on the face of the panel, tiles, each tile matchable with a tile position, a symbol on each tile, a removable panel cover fastened to overlie the tile positions on the panel in fixed relation thereto, indicating means fixed relative to the panel when the panel cover is fastened to overlie the tile positions, said indicating means indicating the locations of the tile positions beneath the panel cover, a symbol on the removable panel cover associated with a symbol on a particular tile and so positioned as to be the sole indication of the tile position with which the particular tile is matchable, and fastening means in the tile and the panel for fastening each tile to the tile position with which it is matchable and to no other tile position.

2. The device of claim 1 in which the fastening means comprises tile magnetic means attached to the tile and position magnetic means attached to the tile position with which the tile is matchable.

3. The device of claim 2 in which the panel cover comprises a non-magnetic sheet stretched tightly over the panel by edge clamping means.

References Cited in the file of this patent

UNITED STATES PATENTS

| | | |
|---|---|---|
| 1,394,620 | Haupt | Oct. 25, 1921 |
| 1,396,379 | Moore | Nov. 8, 1921 |
| 1,696,988 | Troidl | Jan. 1, 1929 |
| 2,570,625 | Zimmerman | Oct. 9, 1951 |
| 2,581,595 | Mioduski | Jan. 8, 1952 |
| 2,673,404 | Abrahamson | Mar. 30, 1954 |
| 2,853,799 | Magnussen | Sept. 30, 1958 |

FOREIGN PATENTS

| | | |
|---|---|---|
| 1,129,286 | France | Sept. 3, 1956 |